Jan. 27, 1948.  J. M. GIRARD  2,434,919
METHOD OF BRAKING AN ASYNCHRONOUS MOTOR
Filed Oct. 30, 1941  2 Sheets-Sheet 1

INVENTOR.
JEAN MARIE GIRARD
BY
James N. Curtin
ATTORNEY

Jan. 27, 1948.　　　J. M. GIRARD　　　2,434,919
METHOD OF BRAKING AN ASYNCHRONOUS MOTOR
Filed Oct. 30, 1941　　　2 Sheets-Sheet 2

INVENTOR.
JEAN MARIE GIRARD
BY
James N. Curtin
ATTORNEY

Patented Jan. 27, 1948

2,434,919

UNITED STATES PATENT OFFICE 2,434,919

METHOD OF BRAKING ASYNCHRONOUS MOTORS

Jean Marie Girard, Boulogne-Billancourt, France, assignor to International Standard Electric Corporation, New York, N. Y., a corporation of Delaware Application October 30, 1941, Serial No. 417,179
In France September 6, 1940

Section 1, Public Law 690, August 8, 1946
Patent expires September 6, 1960

3 Claims. (Cl. 318—211)

The present invention relates to apparatus for stopping electric motors.

It is frequently important, particularly in order to save time in certain operations of high power factory machines, quickly and precisely to stop the machine in order, for example, to permit withdrawal of a fabricated piece and its replacement with an unfabricated piece. Braking systems heretofore used have comprised mechanical or electro-mechanical means necessarily resulting in wear of the mechanical pieces and requiring frequent adjustments.

In accordance with features of the invention an asynchronous motor may be braked by supplying a continuous current to replace the rotating field with a fixed field. This continuous current may be supplied by the discharge of a condenser, for example, the latter may liberate its potential energy which may be used quickly to stop the motor by opposing its kinetic energy.

The invention will be described in conjunction with an illustrative embodiment with reference to the drawings included herewith, in which:

Fig. 1 schematically represents an embodiment illustrating the case of a condenser charged by a single phase;

Figure 1:
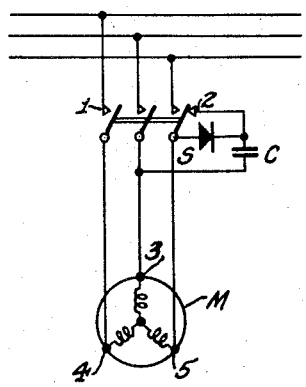

Referring to Fig. 1, the asynchronous motor is shown as M having stator windings connected to the three-phase line by the contactor 1.

In accordance with features of the invention, a large capacity condenser C is charged across a rectifier S connected across two phases of the motor on the motor side of contactor 1. The condenser is thus charged by a single phase current with alternating current across the rectifier S while the motor M operates in a normal way.

When the contactor is dropped out, that is to say, when the motor is disconnected from the line, a stopping or rest contact 2 is made by means of which the condenser may discharge into two phases of the stator of the asynchronous motor. In Fig. 1, the discharge of the condenser is made between points 3 and 5 across the rest contact 2 of the contactor 1. The magnitude of intensity of the discharge current from the condenser may be very great, the discharge being within a very short interval of time, and by appropriately selecting circuit elements the motor may be stopped within one revolution, even within less than a revolution.

It is apparent that the embodiment described, which represents general case of a small asynchronous motor, may be replaced by different circuits in accordance with the invention and in accordance with operating requirements.

Figure 2:
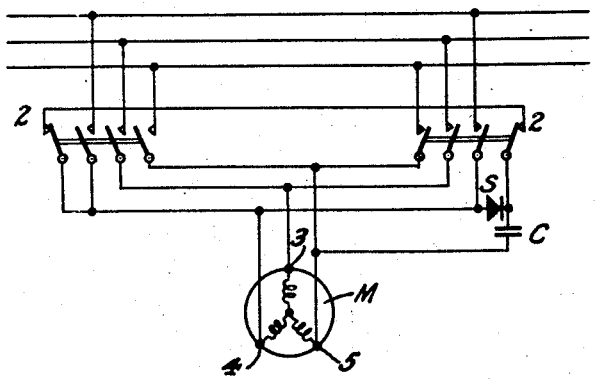
Fig. 2 represents another embodiment in illustrating the same case of charging but for a motor which may rotate in either direction.

In Fig. 2, a reversing asynchronous motor is shown. The drawing is self-explanatory with reference to the description in connection with Fig. 1.

Figure 3:
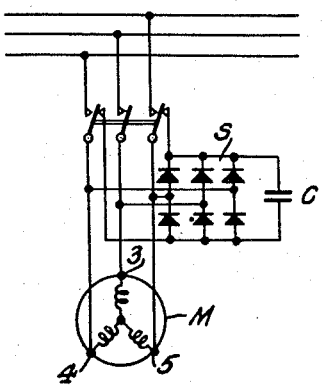
Fig. 3 represents still another example of an embodiment illustrating the case of full-wave three-phase rectification.

Fig. 3, represents another embodiment in which, in order to obtain the fastest charging of the condenser, two alternating currents of the three-phase feeding current are employed. This arrangement is advantageous in cases when the operating time of the motor is very short, for example, only for a few revolutions. The condenser may thus be charged very rapidly and reach the required volume even for the very short operating time of the motor. The rectifier system S in this figure may comprise six elements in accordance with well known rectifier methods, which may deliver full-wave rectification for each of the three phases.

It is also possible, according to other features of the invention, to vary the effect of the braking condenser by controlling the quantity of energy it may store. To this end, it may be charged with different voltages by, for example, varying the supply voltage to the system of rectifiers, by the intermediate means of a variable transformer. On the other hand, a variable number of condensers may be employed, for example, or a resistance or reactance may be included in the circuit of the condenser to increase the time constant of the circuit or to modify the form of the discharge current.

It will be seen that the kinetic energy in the rotating parts of the motor may be compensated for by an equal amount of energy stored in electrical form in the battery of condensers.

The condenser described in the embodiment shown may be replaced by other suitable elements for storing electrical energy, for example, a self inductance. In this case the self inductance would store electrical energy in the form of electro magnetic energy instead of electro static in the case of the condenser described in the preferred embodiment of the invention shown in Figs. 1, 2, 3. Discharge of this self conductance may be made, for example, by means of a transformer arrangement the secondary of which comprises a number of turns related to the asynchronous motor characteristics, and this discharge will, in general, be weak. The electro magnetic energy stores in the self inductance and liberated by opening the supply circuit, thus supplying the latter with a continuous current, would be sent, when the motor circuit is closed, to the turns coupled with the self inductance and comprising with the latter a transformer. In this way, a current impulse, which would have a braking effect and thence stop the rotor of the motor, would be produced in the secondary of this transformer.

The above described methods of treatment represent important advantages over known means. They give rise to no sudden load or demand upon the feeding circuit since the braking energy is stored up in a normal manner during normal operation of the motor. They do not involve any mechanical parts which would be subject to wear or require adjustment of the slightest degree. The stored energy employed for stopping the motor may be varied at will, thus permitting partial or progressive braking as well as sudden stops.

Figure 4:
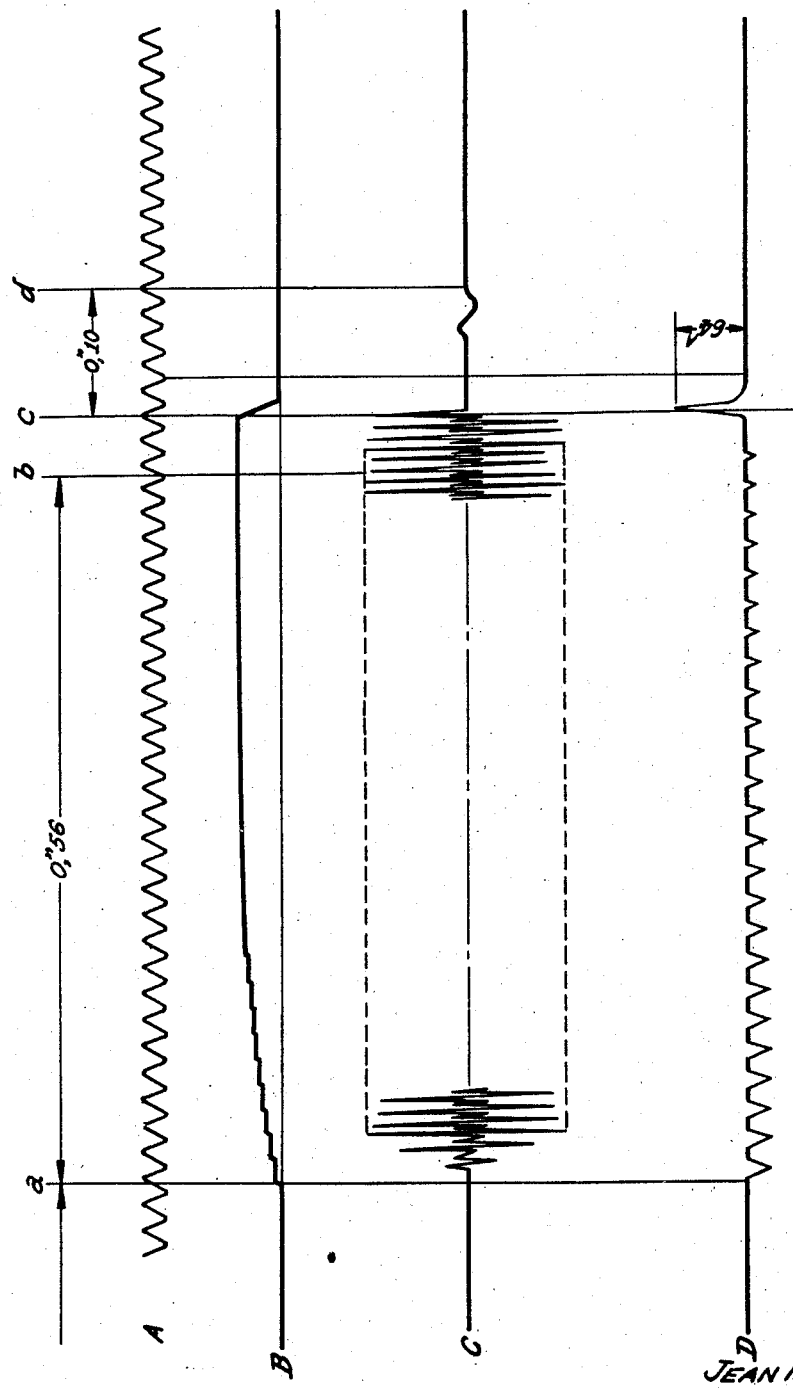
Fig. 4 represents an oscillogram illustrating operation of the embodiment shown in Fig. 1.

By way of example, Fig. 4, represents results of tests made by applicant on an asynchronous motor of one horse power operating at 3000 revolutions per minute and connected as shown in Fig. 1. The condenser was of 2000 microfarads capacity and had been charged with the peak voltage from a 200 volt network—that is, with about 280 volts. The oscillogram in the drawing shows at A 50-cycle undulations which were used for the time reference; the curve B represents voltage at the condenser terminals, and the curve C represents the speed of rotation of the given motor, as obtained by two permanent magnets fixed to the axis and rotating opposite two fixed coils. The current in the condenser circuit is shown at D.

At the instant "a" the motor has been set in motion, and at the instant "b" corresponding to an operating time of 0.56 second the condenser has been completely charged. At the instant "c" the stopping apparatus has been set in operation. It will be observed from the curve B how voltage at the condenser terminals decreases, and from curve D the current impulse sent by the latter to the stator of the motor. The amplitude of this impulse was found to be 64 amperes and the motor was stopped within one revolution at the instant "d," that is to say, in about $\frac{1}{15}$ second.

Although the present invention has been described in connection with the embodiments shown in conjunction with an asynchronous motor, it is apparent that it is adaptable to many variations and may be applied particularly to other types of motors.

What I claim is:

1. A motor control circuit comprising a multiphase alternating current supply line, switch means in one position connecting said motor to said supply line and in the other position disconnecting said motor from said supply line, a condenser rectifier circuit permanently connected across at least one phase of said supply line on the side of said switch means toward said motor, and a contact connected between said rectifier and condenser and arranged to be closed by said switch means in its motor disconnecting position to short circuit said rectifier, whereby the condenser discharge serves to stop said motor.

2. A motor control circuit according to claim 1, wherein said switch means comprises two interrelated switching systems for selectively reversing the direction of rotation of said motor.

3. A motor control circuit according to claim 1, wherein said condenser rectifier circuit comprises rectifier units arranged as full wave rectifiers across each phase of said supply line.

JEAN MARIE GIRARD.

REFERENCES CITED

The following references are of record in the file of this patent:

UNITED STATES PATENTS

| Number | Name | Date |
|---|---|---|
| 1,754,779 | Thurston | Apr. 15, 1930 |
| 2,175,935 | West | Oct. 10, 1939 |
| 2,246,289 | Brockhaus | June 17, 1941 |